Nov. 18, 1947.  J. H. SCHMIDT, JR  2,430,997
CONVERTIBLE CENTER DRILL AND LIVE AND DEAD CENTER
Filed Jan. 2, 1945

Inventor
John H. Schmidt, Jr.
By Philip A. Friedell
Attorney

Patented Nov. 18, 1947

2,430,997

UNITED STATES PATENT OFFICE 2,430,997

CONVERTIBLE CENTER DRILL AND LIVE AND DEAD CENTER

John H. Schmidt, Jr., Oakland, Calif.

Application January 2, 1945, Serial No. 571,095

6 Claims. (Cl. 82—33)

1

This invention, a convertible center drill and live- and dead-center, is primarily designed for use in the tail stocks of lathes and similar machines, to facilitate the center drilling and centering operations on work to be turned, by eliminating replacement of drills and centers or attachments therefor, specifically the steps of replacing a center by a center drill, centering the work, drilling, and replacing the drill by a center.

With this invention the work need only be located once, because the operations are carried out in sequence through a single set-up, the same tool being used as center drill, and thereafter selectively as a live-center or a dead-center, through manipulation of a single controlling element. This element is movable to three positions, in one of which the tool functions as a center drill, and in the others of which it functions respectively as a live-center and as a dead-center. It can be adapted to any type of machine or tool in which centering of work is required, and is equally applicable to head stocks and tail stocks.

The objects and advantages of the invention are as follows:

First, to provide a center for turning tools or machines and which is convertible at will into a center drill, a live-center, or a dead-center, through a single manual control.

Second, to provide a device as outlined which requires only a single-set-up for center drilling, centering, and supporting the work, without the use of any attachments or substitutions.

Third, to provide a device of the type outlined which is simple in construction and operation, and which is composed of a minimum number of parts.

Fourth, to provide a device as outlined in which the drill element is easily removable and replaceable for sharpening or renewal.

Other objects and advantages of the invention will become apparent as the following description is read on the drawings forming a part of this specification, in which.

Figure 1:
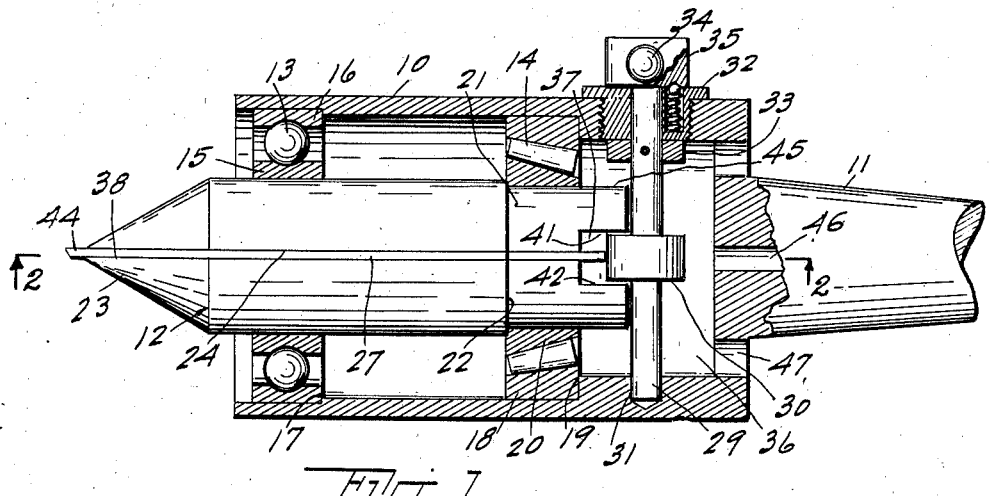
Fig. 1 is a longitudinal sectional elevation through the invention.

The invention consists of a sleeve 10 having a taper shank 11 axially extending from one end to

2 fit the standard taper in the tail stock spindle of a lathe or similar tool.

Rotatably mounted in the sleeve 10 is a center 12, preferably supported in anti-friction bearings, such as the radial ball bearing 13 at the forward end, and by a radial-thrust ball or roller bearing 14 at the rearward end, the inner race 15 of the forward bearing being mounted on the center, and the outer race 16 being pressed in the sleeve against a shoulder 17; while the rear bearing 14 has its outer race 18 pressed against a shoulder 19 in the sleeve, and its inner race 20 pressed on the reduced portion 21 of the center and against the shoulder 22. Thus the center is normally rotatable in the sleeve and relative to the tapered shank 11, and will resist thrust against the conical end 23 of the center.

The center 12 has a groove 24 formed radially throughout its length and extending from a point at or below the axis 25 as indicated at 26, and a drilling element 27 slidably fits in this groove and inside the inner races of the bearings, the blade being relieved as indicated at 28 to the diameter of the reduced portion 21 of the center.

Figure 2:
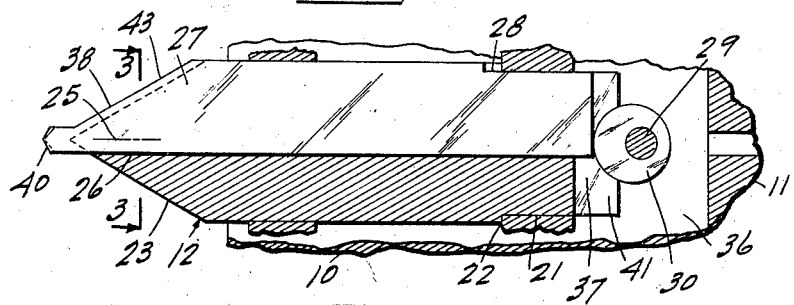
Fig. 2 is a fragmentary section, taken on line 2—2 of Fig. 1.
Figure 3:
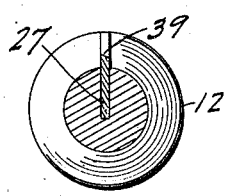
Fig. 3 is a section taken on line 3—3 of Fig. 2.

Diametrically rotatably mounted in the sleeve 10 is a shaft 29 on which is formed or secured a cam or disc 30 eccentrically located as is clearly illustrated in Fig. 2, the lower end of the shaft having bearing in one wall of the sleeve as indicated at 31 while the upper end has bearing in the member 32 which is threadedly secured in the opposite wall of the sleeve, the shaft being retained by the thrust collar 33 and rotatable at will through operation of the handle or lever 34 fixed in or integral with the head 35.

There is sufficient clearance back of the shaft as indicated at 36 to permit complete rotation of the disc 30, and a slot 37 is formed in the rear end of the center as shown and having a width clearing the thickness of the eccentric or disc, and a depth sufficient to permit complete rotation of the eccentric, while the blade 27 extends back into the slot 37 for cooperation with the eccentric through a predetermined arc of movement of the lever 34.

The bit end of the blade, indicated at 38, has the same taper as the conical end of the work center and is formed with a suitable cutting edge as indicated at 39 and terminates in a drill point or bit 40.

When used in a tail stock, the sleeve 10 is stationary. Fig. 1 shows the eccentric in a central position where it has not urged the blade outwardly but where the eccentric is interposed between the walls 41 and 42 of the slot 37. In this position the eccentric secures the work center against rotation relative to the sleeve, resulting in a dead center. In this condition its principal use would be in connection with the head stock, with a dog and driver, though for some set-ups and operations, the same would apply to tail stocks.

If the lever 34 is swung to the right viewing Fig. 1, the eccentric will not cooperate with the blade 27 and will be moved out of the slot 37, leaving the center free to rotate, resulting in a running, or live center.

If the lever is swung to the left, viewing Fig. 1, the eccentric will force the blade 27 forward to the position indicated at 43 in Fig. 2, advancing the drill bit 44 for drilling the axial clearance hole, and the cutter 43 to center-reaming position. When the center is drilled, it is merely necessary to swing the lever 34 to center if a dead center is desired, and clear to the right if a live or running center is desired, and advance the tail stock the slight amount necessary to take up the space occupied by the projecting portion of the cutter blade during drilling.

Thus, for center drilling and centering the work, the lever 34 is moved to the left, the tail stock is advanced to the work and the center drilled. The lever 34 is then swung clear to the right, and the tail stock advanced only very slightly, which completes the operation of center drilling and centering and supporting the work on a running or live center, in comparison with the conventional method of placing a center drill in the tail stock, advancing the tail stock to drill the work center, retracting the tail stock, removing the drill, installing the center, advancing the tail stock to take the work.

The threaded member 22 is provided so that the cam or eccentric can be installed, removed, renewed or replaced.

This is carried out by first turning the lever 34 clear to the right, unscrewing the member 22, after which the eccentric can be raised to clear the top of the rear end of the work center indicated at 45, following which the device can be moved to pass through the opening left by removal of the threaded member.

A hole 46 may be formed axially through the taper shank for access to the spindle and bearings for removal, or, holes can be formed through the rear wall of the sleeve as indicated at 47, for the same purpose.

I claim:

1. A tool for lathes and the like, in combination, a support member, a running center having a drilling member adjustable therein, and means including adjusting and locking means operable for adjusting said drilling member into operative position and for simultaneously locking said running center against rotation to convert said running center into a center drill, at will.

2. A tool as defined in claim 1; said first means including an engaging member associated with said support and cooperatively related to said running center and to said drilling member and adjustable to three positions, to one of which said tool is converted into a center drill, in another of which said tool is converted into a running center, and in the third of which said engaging member locks said running center against rotation while leaving said drilling member free, to convert said tool into a dead center.

3. A tool for lathes and the like, comprising; a sleeve having a shank at one end for mounting in the spindle of a lathe or the like; a work center rotatably mounted in said sleeve and having a center-drilling member adjustable therein; and means operable for adjusting said center-drilling member into operative positions for drilling centers and simultaneously locking said work center against rotation in said sleeve, and releasable for retraction of said drilling member within the tool to convert said tool into a work center.

4. A structure as defined in claim 3; said work center having a slot formed radially throughout its length and extending to or below the axis; said center drill bit comprising a cutter blade terminating in a drill bit and slidable longitudinally in said slot; said manually operable means comprising a cam member movable in one direction to cooperate with the inner end of said blade and advance the blade with its drill bit into drilling position to project beyond the conical end of the work center, and movable in the other direction to release said blade for its return within the work center out of drilling position.

5. A tool for lathes and the like, comprising; a sleeve having a taper shank at one end for mounting in the tail stock of a lathe or the like; a work center rotatably mounted in said sleeve and having a center drilling member adjustable therein; and means manually operable for adjusting said center drilling member into operative position for drilling centers, and releasable for retraction of said center drilling member within the tool to convert said tool into a work center; said work center having a slot formed radially throughout its length and extending inwardly to or below the axis thereof; said center drill bit comprising a cutter blade slidable longitudinally in said slot and terminating in a drill bit at its outer end; said work center having a transverse slot formed across its inner end; said manually operable means comprising a cam member rotatably supported in said sleeve diametrically, and movable to three positions, in one of which said cam member extends into said transverse slot to lock said work center against relative rotation; in another of which said cam member extends further into said transverse slot to urge said blade forward to operate as a center drill while simultaneously locking said work center against rotation; and in the third of which said cam member clears said transverse slot to release said work center for free relative rotation.

6. A tool for lathes and the like comprising; a sleeve having an axial support member at one end; a work center rotatably supported in said sleeve and having a radial slot formed throughout its length and extending to or below the axis of the work center, and a transverse slot formed in the rearward end; a drilling member slidable in said slot; a shaft diametrically rotatably mounted in said sleeve and having a cam member cooperatively related to said drilling member and to said transverse slot and having means for manual operation movable to three positions, in one of which said cam clears said transverse slot for free relative rotation of said work center and retraction of said drilling member; in another of which said cam member extends into said transverse slot to lock said work center against relative rotation to form a dead center; and in the third of which said cam member forces said drilling member to project beyond the conical end of said work center to operate as a center drill and simultaneously lock said work center against relative rotation.

JOHN H. SCHMIDT, Jr.

REFERENCES CITED

The following references are of record in the file of this patent:

UNITED STATES PATENTS

| Number | Name | Date |
| --- | --- | --- |
| 2,366,806 | Roofe | Jan. 9, 1945 |
| 1,814,087 | Hayward | July 14, 1931 |

OTHER REFERENCES

American Machinist, April 6, 1922, page 529, article by J. A. Raught. (Copy in Division 13. Class 82/33.)